United States Patent [19]

Arai

[11] Patent Number: 4,557,055
[45] Date of Patent: Dec. 10, 1985

[54] RAINBOW PROJECTOR

[75] Inventor: Akira Arai, Tokyo, Japan

[73] Assignee: Nihon Ouyou Kougaku Kabushiki Kaisha, Tokyo, Japan

[21] Appl. No.: 633,918

[22] Filed: Jul. 24, 1984

[30] Foreign Application Priority Data

Jul. 29, 1983 [JP] Japan .................... 58-118491[U]

[51] Int. Cl.$^4$ ............................................ G03B 21/28
[52] U.S. Cl. ..................................... 353/81; 353/102; 353/119
[58] Field of Search .................... 353/81, 102, 119, 62, 353/58, 74–79; 272/8 P, 8 D, 10

[56] References Cited

U.S. PATENT DOCUMENTS

| 563,334 | 7/1896 | Tucker | 272/10 |
| 1,811,770 | 6/1931 | Wheeler | 353/102 X |
| 2,341,223 | 2/1944 | Lillie | 353/81 X |
| 3,479,117 | 11/1969 | Tronnier et al. | 353/102 |

FOREIGN PATENT DOCUMENTS

| 382981 | 10/1923 | Fed. Rep. of Germany | 272/10 |
| 626593 | 5/1927 | France | 353/62 |
| 1124726 | 7/1956 | France | 353/58 |

Primary Examiner—Harry N. Haroian
Attorney, Agent, or Firm—Birch, Stewart, Kolasch & Birch

[57] ABSTRACT

The present invention relates to a rainbow image projector adapted to project a vivid rainbow image from a relatively small light source onto walls of a stage, a store, places for various parties, and like. Specifically, light rays emitted from the linear incandescent light source are converted by a cylindrical condenser lens into parallel light rays which are, in turn, obliquely incident on a triangular prism over whole area of its first refraction plane. Thus, it is possible to project a vivid rainbow image of a large curvature radius from the small light source of small power consumption and heat generation. A housing containing therein said linear light source, cylindrical condenser lens and prism and provided with a projection window is inclination-adjustably mounted an inclination adjustment screw on a support leg so that a direction in which the rainbow image is projected may be variable. Said housing further comprises a blower for cooling contained therein and has a rear cover for exchange of the light source so that a useful life of the light source may be prolonged and maintenance and/or checking thereof may be easily done.

3 Claims, 6 Drawing Figures

RAINBOW PROJECTOR

BACKGROUND OF THE INVENTION

The present invention relates to a rainbow projector adapted to project rainbow image onto walls of store, stage, a place of party, etc.

It has been principally well known to direct parallel rays coming from a light source into a prism and then to project a spectrum thereof onto a wall or like as a rainbow image. However, no rainbow projector has ever been known, which creates a sufficiently vivid rainbow image to be practically useful for stage lighting. According to the above-mentioned principle, light rays emitted from a light source may be converted through a condenser lens into parallel rays which are, in turn, directed into a prism to achieve a rainbow projection. So far as said light source is a point source, however, no vivid rainbow image can be obtained, since it will be impossible to obtain an adequate quantity of light if said point source is excessively small while it will be more and more difficult to obtain parallel rays as said point source is enlarged. A rainbow projector has already been proposed to which a slit is interposed between the light source and the condenser lens so that the parallel rays exitting from said slit are directed by a spherical lens into the prism. However, such a proposal is not practically useful, since this arrangement is disadvantageous in that said slit results in an extreme reduction of light quantity and the spherical lens of a relatively large diameter determined by a length of said slit will be necessary.

SUMMARY OF THE INVENTION

A first object of the present invention is, in view of the aforementioned problems, to provide a rainbow projector comprising a small linear light source for emission of white light, a cylindrical condenser lens longer than said linear light source adapted to condense light rays coming from said linear light source into parallel light rays and a triangular prism having its first refracting surface upon whole area of which said parallel light rays are obliguely incident to project a vivid rainbow image of a large radius of curvature with respect to said small light source.

A second object of the present invention is to provide a rainbow projector wherein said linear light source, cylindrical condenser lens and prism are contained within a common housing provided with a rainbow image projecting window and said housing is mounted by an inclination adjustment screw on a support leg so as to adjust the direction in which the rainbow image is projected.

A third object of the present invention is to provide a rainbow projector wherein a blower for cooling is contained within said housing and the linear light source is easily exchangeable upon removal of a rear cover of said housing.

These and other objects, features and advantages of this invention will be apparent from the following description in detail and the accompanying drawing of the invention.

DESCRIPTION OF A PREFERRED EMBODIMENT

Figure 1:
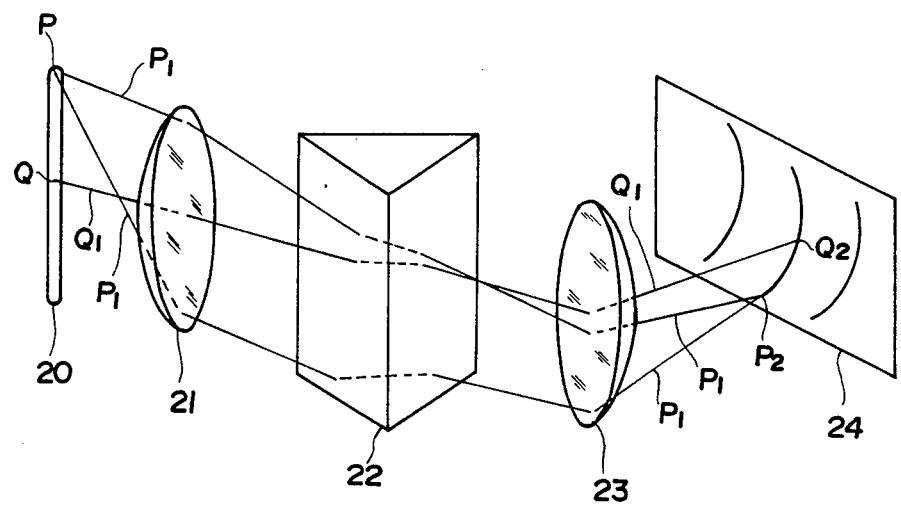
FIG. 1 is a schematic diagram illustrating a spectral diffraction by a triangular prism, which has usually been known.
Figure 2:
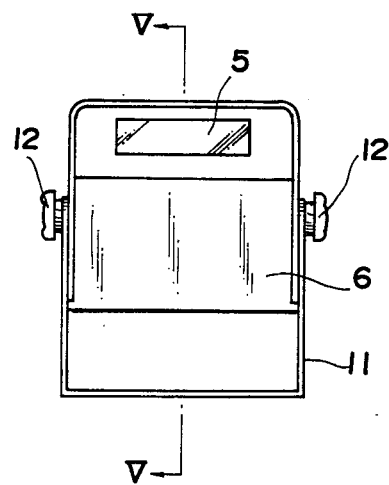
FIG. 2 is a front view illustrating an embodiment of the projector according to the present invention.
Figure 3:
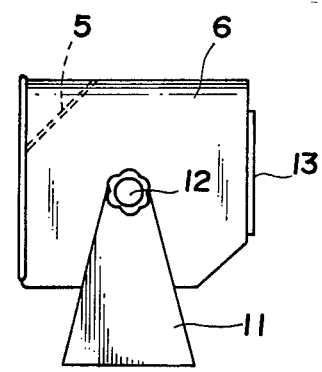
FIG. 3 is a side view of said projector.

First, a principle of the present invention will be discussed in reference with FIG. 1. It is known that images of spectral lines formed by incidence of parallel light rays upon a prism served for spectral diffraction present bow-shaped curves. Such curved images are due to a fact that, for example, a light ray P1 coming from an end point P of a slit 20 is obliquely incident on a prism 22 at an angle with its principal plane and focussed on an image plane 24 at an end point P2 of a curve section while a light ray Q1 coming from a middle point Q of the slit and going along the principal plane is focussed on the image plane 24 at an apex point Q2 of said curve section. Referring to FIG. 1, reference numeral 21 designates a collimator lens and a reference numeral 23 designates a projector lens.

Term "parallel light rays" as used herein refers to any light rays which are parallel to one another in the prism.

Figure 4:
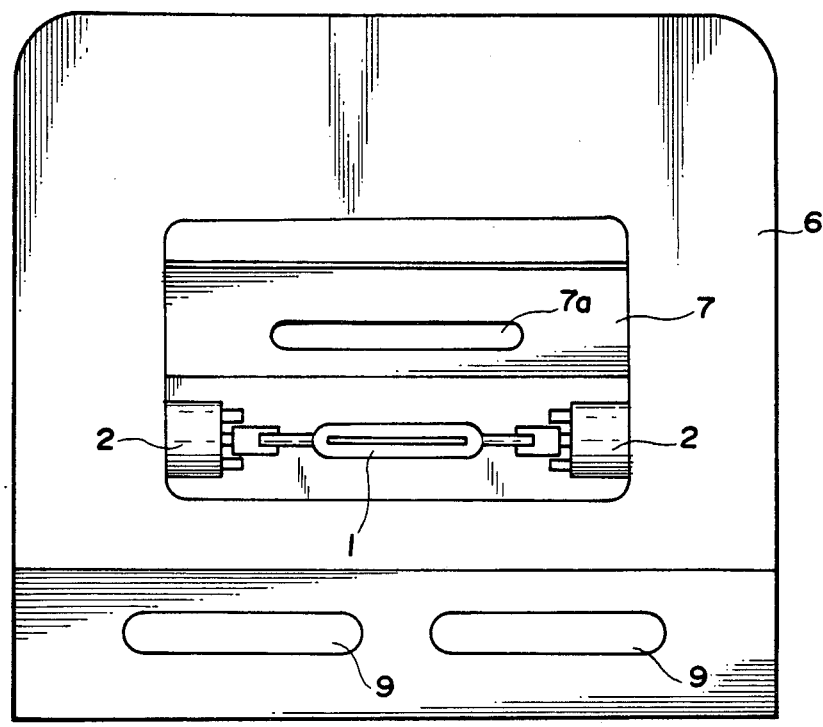
FIG. 4 is a rear view of said projector with a rear cover of a housing being removed.
Figure 5:
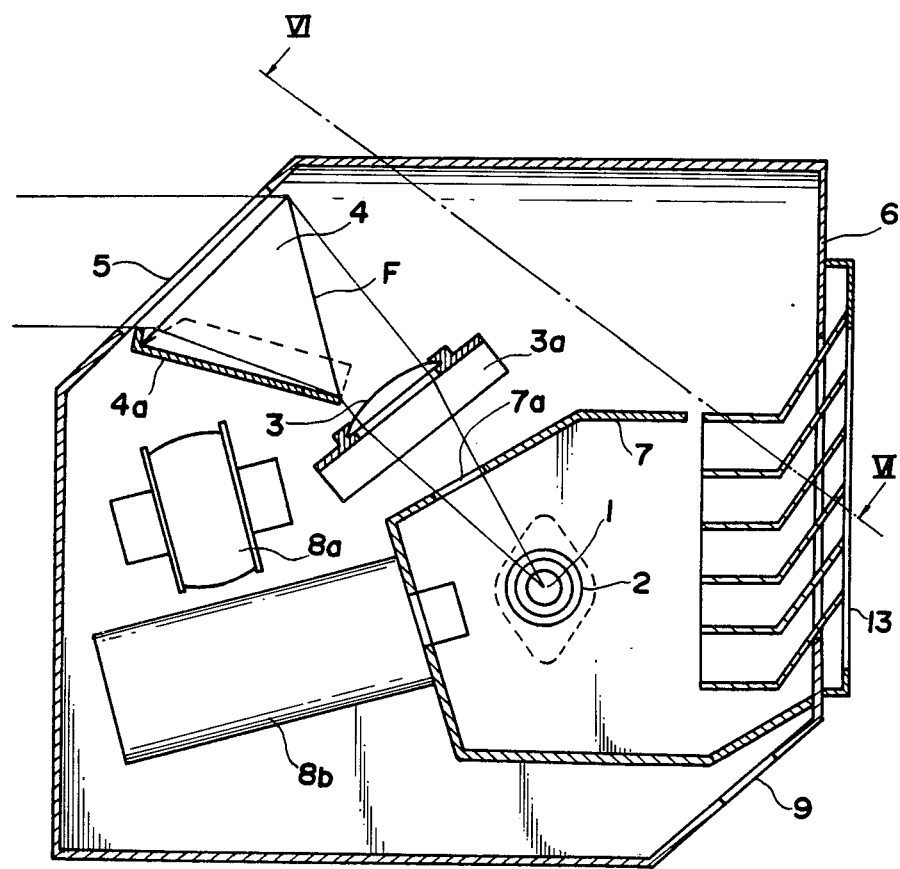
FIG. 5 is a sectional view of an important part taken along a line V—V in FIG. 2.
Figure 6:
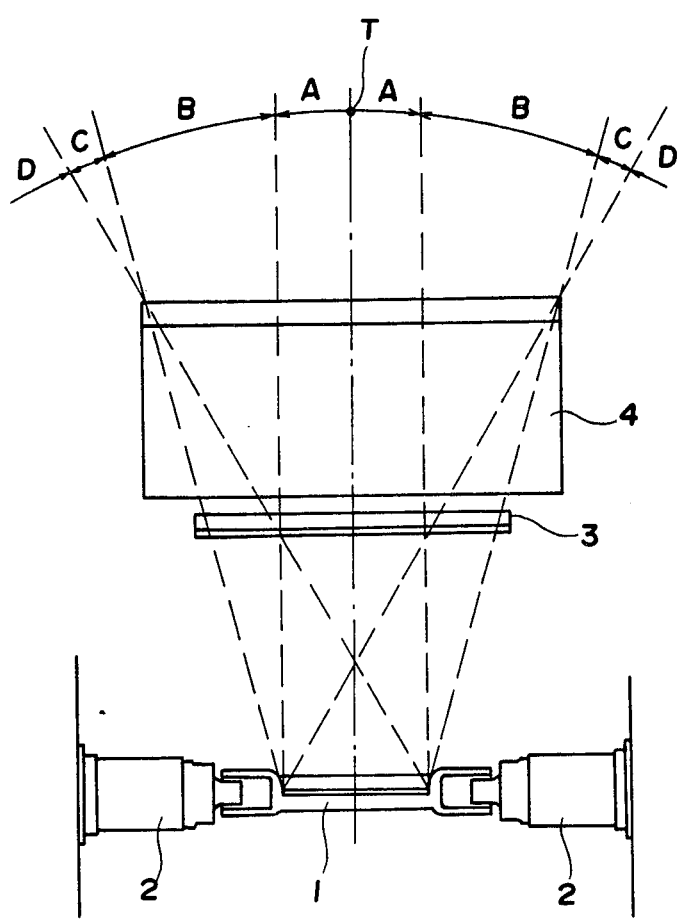
FIG. 6 is a schematic diagram illustrating an optical system according to the present invention as viewed in a direction along a line VI—VI in FIG. 5.

The present invention will be now described in detail with respect to a preferred embodiment as illustrated by FIGS. 2 to 6. Referring to FIGS. 5 and 6, referance numeral 1 designates a linear light source for emission of white light and reference numeral 2 designats a socket thereof. In this embodiment, the linear light source 1 comprises a tubular halogen incandescent lamp containing line filaments therein. Reference numeral 3 designates a cylindrical condenser lens adapted to convert diffused light rays into parallel light rays. Said condenser lens 3 is positioned by a mounting member 3a with the length thereof extending in parallel to said linear light source and normal to the optical path. Said condenser lens 3, as seen in FIG. 6, is at least twice as long as the linear light source 1 and is adapted to receive the light rays diverging from said linear light source 1, like a fan and to then convert said light rays into parallel light rays which are similarly in a fan-shape. Reference numeral 4 designates a triangular prism adapted for spectral diffraction of said parallel light rays obtained by the condenser lens 3 and positioned by its mounting member 4a with the length thereof extending in parallel to the condenser lens 3 so that the parallel light rays obtained by the condenser lens 3 may be obliquely incident upon a first refracting plane F of the prism 4. Preferably, a length of this prism 4 is substantially equal to that of the condenser lens 3. Further, the linear light source 1, the condenser lens 3 and the prism 4 must be located in a laterally symmetric relationship to obtain a laterally symmetric rainbow. Reference numeral 5 designates a projection window through which the parallel light rays spectrally diffracted by the prism 4 are projected onto a wall or a stage, 6 a housing within which the projector according to the present invention is contained, and 7 shield adapted to shield the linear light source 1 so as to prevent any extra light from leaking to the exterior. This shield 7 is provided with a window 7a through which only desired light rays are directed to the condenser lens 3. Reference numerals 8a, 8b designate blowers for cooling a heat generated from the linear light source 1 and reference numeral 9 designates a cooling hole. Additionally, in FIGS. 2 and 3, reference numeral 11 designates a support leg for the housing 6 and reference numeral 12 designates an inclination adjustment screw adapted to secure the support leg 11 to the housing 6 and to include said housing 6 around this securing axis. As best seen in FIG. 4, upon removal of a rear cover 13 of the housing 6, the linear light source 1 is easily exchangeable.

Now the manner in which the projector according to the present invention arranged as has been described hereinabove operates will be described. Diffused light rays coming from the incandescent linear light source 1 are converted by the condenser lens 3 into parallel light rays. This condenser lens 3 is useful to create a vivid or bright rainbow from a relatively small light source and, in consequence, a heat generated from said light source is maintained at a low level, making it possible to utilize relatively compact blowers 8a, 8b. It is also conceivable to adopt a slit in order to obtain the parallel light rays, but this is not preferable, since the slit will lead to an extreme reduction of light quantity. Now the parallel light rays are directed to the prism 4. To obtain a vivid rainbow image, an angle at which the parallel light rays are incident upon the first refracting plane is preferably set to such an angle that all the incident light rays can be effectively refracted by the overall area of this plane, as illustrated in FIG. 5. The parallel light rays spread in a sector form as seen in FIG. 6, when said optical system is looked down. By projecting these parallel light rays, after subjecting to the spectral diffraction through the prism 4, onto the wall or like, it is possible to create a rainbow image having a point T on an extension of the central line defined by the optical system as an apex and a radius of curvature substantially larger than the length of the linear light source 1. Referring to FIG. 6, Portions A contain light rays entering in parallel to the principal plane of the prism which are subjected to a relatively small refraction and, in consequence, create a section of the rainbow which is substantially horizontal. Portions B exusively contain light rays entering obliquely with respect to the principal plane which are subjected to a relatively large refraction and, in consequence, create sections of the rainbow which are progressively curved down as the sections are spaced from the apex T of the rainbow. Portions C contain only a portion of the light rays emitted from the linear light source 1 and become gradually darker until the associated portions D where no section of the rainbow appears. Thus, an arched rainbow image of a large radius of curvature as a whole can be projected on the image plane. To obtain exclusively vivid sections of the rainbow image, the portions C may be covered by suitable means such as shields. Further, a height at which the rainbow image is projected can be adjusted merely by changing an inclination of the housing through the inclination adjustment screw 12.

Although it is principally possible to utilize, as the light source, the one which can be classified as the point light source rather than the linear light source, such selection will result in an inconvenience that the size of the light source and, therefore, the quantity of light are restricted. Specifically, to obtain a vivid rainbow image, the light rays leaving the condenser lens should be parallel to one another as accurately as possible. With the point light source, however, enlarging such light source would make it correspondingly difficult to obtain these parallel light rays. On the contrary, use of the linear light source in accordance with the present invention assures that a size of the light source can be selected with its length and a desired quantity of light can be increased in proportion to said length. Furthermore, in order that the light emitted from an elongate light source may be effectively projected through the spherical lens onto a wall or like, a lens of the correspondingly large diameter has usually been required, but the present invention provides the cylindrical lens as said condenser lens so that this cylindrical lens may be longitudinally enlarged to achieve the purpose. Accordingly, the projector constructed according to the present invention provides a combination of the linear light source and the cylindrical lens by which a large quantity of light can be effectively condensed and light rays which are parallel to one another as accurately as possible can be directed into the prism so as to project a vivid rainbow image on a wall or like. As aforementioned, the rainbow image projector according to the present invention is so arranged that light rays emitted from a relatively small linear incandescent light source are condensed by a cylindrical condenser lens longer than said linear light source to converted these light rays into parallel light rays which are, in turn, obliquely incident on a triangular prism over whole area of a first refraction plane thereof. This means that a vivid rainbow of a large curvature radius can be projected onto a wall or like from a small light source which is low not only in power consumption but also in heat generation. Such feature is extremely advantageous in practice, for example, in lighting of store, wedding hall, stage and theatre.

What is claimed is:

1. A rainbow image projector adapted for projection of an arched rainbow image onto a wall or like comprising a linear incadescent light source, a cylindrical condenser lens extending in parallel to said linear light source and adapted to receive light rays diverging from said linear light source in a fan-shape and to convert these light rays into parallel light rays similarly divergent in a fanshape, said cylindrical condenser lens being at least twice as long as said linear light source, and a triangular prism extending in parallel to said cylindrical condenser lens and adapted to receive said parallel light rays coming from said condenser lens so that sad parallel light rays divergent in a fan-shape are obliquely incident upon the triangular prism over whole area of its first refraction plane.

2. A rainbow image projector according to claim 1, further comprising a housing containing therein said linear light source, cylindrical condenser lens and prism, said housing having a rainbow image projecting window, and a support leg on which said housing is mounted by an inclination adjustment screw so that a direction in which the rainbow image is projected may be variable.

3. A rainbow image projector according to claim 2, further comprising a blower for cooling is provided within said housing and said housing is provided with a rear cover for exchange of the linear light source.

* * * * *